(12) United States Patent
Capdevielle et al.

(10) Patent No.: US 9,629,039 B2
(45) Date of Patent: Apr. 18, 2017

(54) CELL PARTITIONING FOR HIGH-SPEED USERS

(75) Inventors: Veronique Capdevielle, Magny les Hameaux (FR); Eitan Altman, Montfavet (FR); Sreenath Ramanath, Montfavet (FR); Laurent Roullet, Bures (FR)

(73) Assignee: Alcatel Lucent, Boulogne-Billancourt (FR)

( * ) Notice: Subject to any disclaimer, the term of this patent is extended or adjusted under 35 U.S.C. 154(b) by 283 days.

(21) Appl. No.: 14/119,642

(22) PCT Filed: May 15, 2012

(86) PCT No.: PCT/EP2012/058989
§ 371 (c)(1),
(2), (4) Date: Nov. 22, 2013

(87) PCT Pub. No.: WO2012/159930
PCT Pub. Date: Nov. 29, 2012

(65) Prior Publication Data
US 2014/0099962 A1    Apr. 10, 2014

(30) Foreign Application Priority Data
May 25, 2011    (EP) .................................... 11305638

(51) Int. Cl.
*H04B 13/02*    (2006.01)
*H04W 36/00*    (2009.01)
(Continued)

(52) U.S. Cl.
CPC ....... *H04W 36/0066* (2013.01); *H04W 16/32* (2013.01); *H04W 52/146* (2013.01);
(Continued)

(58) Field of Classification Search
CPC . H04W 16/32; H04W 36/0066; H04W 36/32; H04W 52/146; H04W 52/367; H04W 52/38; H04W 64/006
(Continued)

(56) References Cited

U.S. PATENT DOCUMENTS

| 5,548,806 A * | 8/1996 | Yamaguchi ........... H04W 36/04 455/441 |
| 2001/0004604 A1 | 6/2001 | Toshimitsu et al. |

(Continued)

FOREIGN PATENT DOCUMENTS

| CN | 101911767 | 12/2010 |
| JP | 5-145477 | 6/1993 |

(Continued)

OTHER PUBLICATIONS

Keisuke Ogawa et al., "Optimum Multi-layered Cell Architecture for Personal Communication Systems with High Degree of Mobility," Vehicular Technology Conference, IEEE, XP010123354, pp. 644-648, Jun. 8, 1994.

(Continued)

Primary Examiner — Thai Vu
(74) Attorney, Agent, or Firm — Fay Sharpe, LLP

(57) ABSTRACT

The present invention relates to a radio access arrangement for operating a radio cell (C), and comprising at least one wireless transceiver (210) configured to set up and operate radio communication channels with mobile devices. In accordance with an embodiment of the invention, the radio access arrangement further comprises speed determination logic (240) configured to characterize a particular mobile device (320) as belonging to a high-speed or lower-speed category (HS; LS) according to speed information of the particular mobile device, and a radio resource controller (250) configured to assign a particular radio communication (Continued)

channel, for communication with the particular mobile device, within a first or second disjoint radio resource partition of the radio cell (B_DL1; B_UL1; B_DL2; B_UL2) if the particular mobile device is characterized as belonging to the lower-speed or high-speed category. The radio access arrangement further comprises a transmit power controller (213) configured to control a transmit power used for communication over the particular radio communication channel as being lower than a first or second substantially higher maximum transmit power level (PTXMAX_DL1; PTXMAX_UL1; PTAX_MAX_DL2; PTXMAX_UL2) if the particular radio communication channel is assigned within the first or second radio resource partition respectively, thereby yielding a long-reach radio coverage area (340) for high-speed mobile devices and a shorter-reach radio coverage area (330) for lower-speed mobile devices. The present invention also relates to a method for operating a radio cell, and to a method for configuring radio resources of radio cells.

15 Claims, 4 Drawing Sheets

(51) Int. Cl.
  *H04W 16/32* (2009.01)
  *H04W 52/38* (2009.01)
  *H04W 64/00* (2009.01)
  *H04W 52/14* (2009.01)
  *H04W 52/36* (2009.01)
  *H04W 36/32* (2009.01)
(52) U.S. Cl.
  CPC ......... *H04W 52/367* (2013.01); *H04W 52/38* (2013.01); *H04W 64/006* (2013.01); *H04W 36/32* (2013.01)

(58) Field of Classification Search
  USPC ......... 455/437, 738, 439, 440, 41, 442, 443, 455/444, 448, 449, 450, 451, 452.1, 452.2
  See application file for complete search history.

(56) References Cited

U.S. PATENT DOCUMENTS

| | | | |
|---|---|---|---|
| 2006/0019665 A1* | 1/2006 | Aghvami | H04W 16/32 455/444 |
| 2006/0182018 A1 | 8/2006 | Bahk et al. | |
| 2008/0043672 A1* | 2/2008 | Sebire | H04W 36/0055 370/331 |
| 2009/0168725 A1 | 7/2009 | Mishra | |
| 2010/0240386 A1* | 9/2010 | Hamabe | H04W 72/085 455/452.2 |
| 2010/0261496 A1* | 10/2010 | Fukumoto | H04W 48/16 455/517 |
| 2011/0269451 A1* | 11/2011 | Liu | H04W 48/12 455/422.1 |
| 2012/0008489 A1 | 1/2012 | Higuchi | |

FOREIGN PATENT DOCUMENTS

| | | | |
|---|---|---|---|
| JP | H05145477 | 6/1993 | |
| WO | 00/33478 | 6/2000 | |
| WO | WO 2006/102918 A1 | 10/2006 | |
| WO | WO 2010078806 A1 * | 7/2010 | H04W 48/12 |

OTHER PUBLICATIONS

International Search Report for PCT/EP2012/058989 dated Jun. 25, 2012.

* cited by examiner

CELL PARTITIONING FOR HIGH-SPEED USERS

TECHNICAL FIELD OF THE INVENTION

The present invention relates to mobile communications, and more specifically to handover of high-speed users moving across short-radius cells.

TECHNICAL BACKGROUND OF THE INVENTION

Thanks to higher spatial reuse of spectrum, short-radius cells (further shortened as picocells) appear as a promising 4th Generation (4G) solution to satisfy bandwidth extensive traffic demands and to enhance the Quality of Experience (QoE) of mobile users.

However, operating high density of picocells raises major issues not only in terms of radio interference but also in terms of mobility management. Given the short distance separating neighbouring picocells, high speed users are expected to cross a large number of picocells in a short time frame. Indeed, the handover rate increases with the user speed and with the inverse of the inter-cell distance.

In this context, guaranteeing a steady QoE to high speed users moving through picocells becomes challenging: cell reselection, Radio Resource Control (RRC) reconfiguration, attachment to the new cell have to be performed in a very short time to maintain call connection and to avoid Radio Link Failures (RLF).

The known solutions to this problem are:
  [Fast HO] The handover procedure is speed up to ensure rapid re-attachment (cell reselection, authorizations, handover preparation) to the most suitable target cell, while preventing unreliable handover attempts.
  [Umbrella Cells] High-speed users are handled by umbrella macro cells.
  [VC] Multiples picocells are combined into one single aggregated virtual Cell (VC).

Fast HO encompasses any mechanism that accelerates the HO, such as scanning optimization duration as described in the European patent application EP2207382 entitled "Method for Prioritizing Handover Targets for scanning by a mobile Terminal in a wireless Network", or optimization of Time-To-Trigger events.

However, it proves inefficient at high speeds. Indeed, HO duration can amount up to 1 second. At 90 km/h, the user would have travelled about 25 meters, which is a very long distance when compared to typical cell radius of pico cells (about 100 meters).

Added to this, physical layer measurements can be critically affected by distance dependent fading, shadowing, etc. So, handover measurements and Time-To-Trigger (TTT) handover have to account for these radio fluctuations and cannot be arbitrarily reduced.

The handover decision process can also account for user speed information. The idea is to re-direct fast-moving users towards overlaying macro cells, referred to as umbrella cells, while slow-moving users keep on being advantageously handled by picocells. An umbrella cell is operated by a distinct macro base station, and has a radio coverage area that encompasses many picocells.

The concept of virtual cells (VC) was first described in the article entitled "*Handoff in Virtual Cells System based on Distributed antenna*" from Y. Mo, J. Xie and B. Huang, published by Wicom in 2006. VC are a set of cooperating radio cells and radio base stations that are seen by the mobile as a single distributed base station. Inside the VC, the mobile can move across the cells without performing handovers. Handover is only performed at VC boundaries. In this way, handover rate is significantly reduced.

VC based handover solution relies on distributed architectures with distributed antennas structure. Added to this, implementation complexity arises from the construction and selection of the VC.

SUMMARY OF THE INVENTION

It is an object of the present invention to provide a solution that is efficient whatever the user speed, that requires minimum implementation complexity, and that is not restricted to specific wireless network architectures.

In accordance with a first aspect of the invention, a radio access arrangement for operating a radio cell comprises at least one wireless transceiver configured to set up and operate radio communication channels with mobile devices. The radio access arrangement further comprises speed determination logic configured to characterize a particular mobile device as belonging to a high-speed category or a lower-speed category according to speed information indicative of a speed of the particular mobile device, and a radio resource controller configured to assign a particular radio communication channel, for communication with the particular mobile device, within a first radio resource partition of the radio cell if the particular mobile device is characterized as belonging to the lower-speed category, or within a second disjoint radio resource partition of the radio cell if the particular mobile device is characterized as belonging to the high-speed category. The radio access arrangement further comprises a transmit power controller configured to control a transmit power used for communication over the particular radio communication channel as being lower than a first maximum transmit power level if the particular radio communication channel is assigned within the first radio resource partition, or as being lower than a second maximum transmit power level substantially higher than the first maximum transmit power level if the particular radio communication channel is assigned within the second radio resource partition, thereby yielding a long-reach radio coverage area for high-speed mobile devices and a shorter-reach radio coverage area for lower-speed mobile devices.

In accordance with another aspect of the invention, a method for operating a radio cell, and further for setting up and operating radio communication channels with mobile devices, comprises the steps of characterizing a particular mobile device as belonging to a high-speed category or a lower-speed category according to speed information indicative of a speed of the particular mobile device, and assigning a particular radio communication channel for communication with the particular mobile device within a first radio resource partition of the radio cell if the particular mobile device is characterized as belonging to the lower-speed category, or within a second disjoint radio resource partition of the radio cell if the particular mobile device is characterized as belonging to the high-speed category. The method further comprises the step of controlling a transmit power used for communication over the particular radio communication channel as being lower than a first maximum transmit power level if the particular radio communication channel is assigned within the first radio resource partition, or as being lower than a second maximum transmit power level substantially higher than the first maximum transmit power level if the particular radio communication channel is assigned within the second radio resource partition, thereby yielding a long-reach radio coverage area for high-speed mobile devices and a shorter-reach radio coverage area for lower-speed mobile devices.

In accordance with still another aspect of the invention, a method for configuring radio resources for radio communication with mobile devices comprises the step of assigning first and second radio resource partitions to first radio cells for communication with lower-speed and high-speed mobile devices respectively, and third single radio resource partitions to second radio cells for communication with mobile devices. The method further comprises the step of configuring first, second and third maximum transmit power levels for communication within the first, second and third radio resource partitions respectively. The second maximum transmit power levels are configured as being substantially higher than the first and third maximum transmit power levels, and respective ones of the second radio resource partitions are configured as being disjoint from respective ones of the first or third radio resource partitions.

A picocell according to the invention consists of an overlay of two or more radio coverage areas, each of which corresponding to a user Equipment (UE) speed class, e.g. a UE high-speed class and a UE low-speed class, and being characterized by a specific maximum transmit power and thus a specific radio coverage reach.

Transmit power is adapted to the user speed class, with notably high transmit power for high-speed users. Large-radius radio coverage areas with boosted transmit power handle fast-moving users, such as motorists, while small-radius radio coverage areas with nominal transmit power keep on handling slow-moving users, such as pedestrians. In this way, high-speed users remain attached to the same cell for a longer duration, which prevents intractable frequent handovers.

To avoid the high transmit power radio coverage area interfering with a neighboring cell, disjoint and non-interfering radio resources partitions are assigned to the respective UE speed classes consistently throughout all the involved radio cells.

Inter-cell interference within the same UE speed class is managed through resource sharing, interference coordination, interference cancellation methods, or alike.

The radio resource controller assigns and schedules radio resources between users, accounting for the UE speed information and for the radio resource partitions pre-allocated to the respective UE speed classes.

UE speed characterization may yield more than two UE speed classes, such as high, medium, and low UE speed classes, each one with a dedicated radio resource partition.

In one embodiment of the invention, the first and second radio resource partitions are first and second disjoint frequency partitions respectively.

In one embodiment of the invention, the first and second radio resource partitions are first and second disjoint time partitions respectively.

Cell partitioning can be carried out in the frequency domain (frequency division duplexing) by assigning respective radio frequency carriers to high-speed and low-speed users, and/or in the time domain (time division duplexing) by assigning respective communication time-slots to high-speed and low-speed users. The latter requires perfect time synchronization between neighboring base stations by means of a common clock reference supplied by e.g. a GPS receiver, or by means a common network time reference.

In one embodiment of the invention, the first and second radio resource partitions are first and second disjoint code partitions respectively.

Cell partitioning can also be achieved by means of spread spectrum techniques by assigning distinct orthogonal codes to high-speed and low-speed users.

In one embodiment of the invention, the speed information is obtained from a source radio access node operating a source radio cell during a handover of the particular mobile device from the source radio cell towards the radio cell.

By so doing, the UE is directed towards the appropriate radio resource partition upon an incoming handover. The UE speed can be determined from e.g. the time the UE spent in the last visited cells.

In one embodiment of the invention, a particular measurement policy for the particular mobile device and for a particular neighbor cell is configured in dependence of whether the particular mobile device is characterized as belonging to the high-speed or lower-speed category, and in dependence of whether the particular neighbor cell supports radio resource partitioning for high-speed and lower-speed mobile devices.

Measurements of neighbor cells reference signals shall be appropriately offset with respect to measurements of the serving cell reference signal, which offset being configured in dependence of the UE speed category, and further in dependence of whether the neighbor cell has a dedicated radio resource partition with a long-reach radio coverage area for handling high-speed users.

In one embodiment of the invention, capacities of the first, second and third radio resource partitions are adjusted in dependence of timing information indicative of a time of the day.

The distribution of bandwidth between speed classes can be adjusted in a semi-static way (semi-static bandwidth partitioning updating expected once or twice per day), depending on the proportion of users from each UE speed class. This proportion is subject to vary during daytime and depending on the covered geographical area. This adjustment shall be carried out consistently throughout all the picocells.

In one embodiment of the invention, the second maximum transmit power levels are configured in dependence of first inter-node distances between first radio base stations operating the first radio cells, and the first and third maximum transmit power levels are configured in dependence of second inter-node distances between the first radio base stations and second radio base stations operating the second radio cells.

The maximum transmit power levels to be used for the respective UE speed classes can be derived from the required inter-cell distance between serving and target cells involved in handover, the latter being configured for a given ratio between inter-cell distance and user speed.

Further characterizing embodiments are mentioned in the appended claims.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
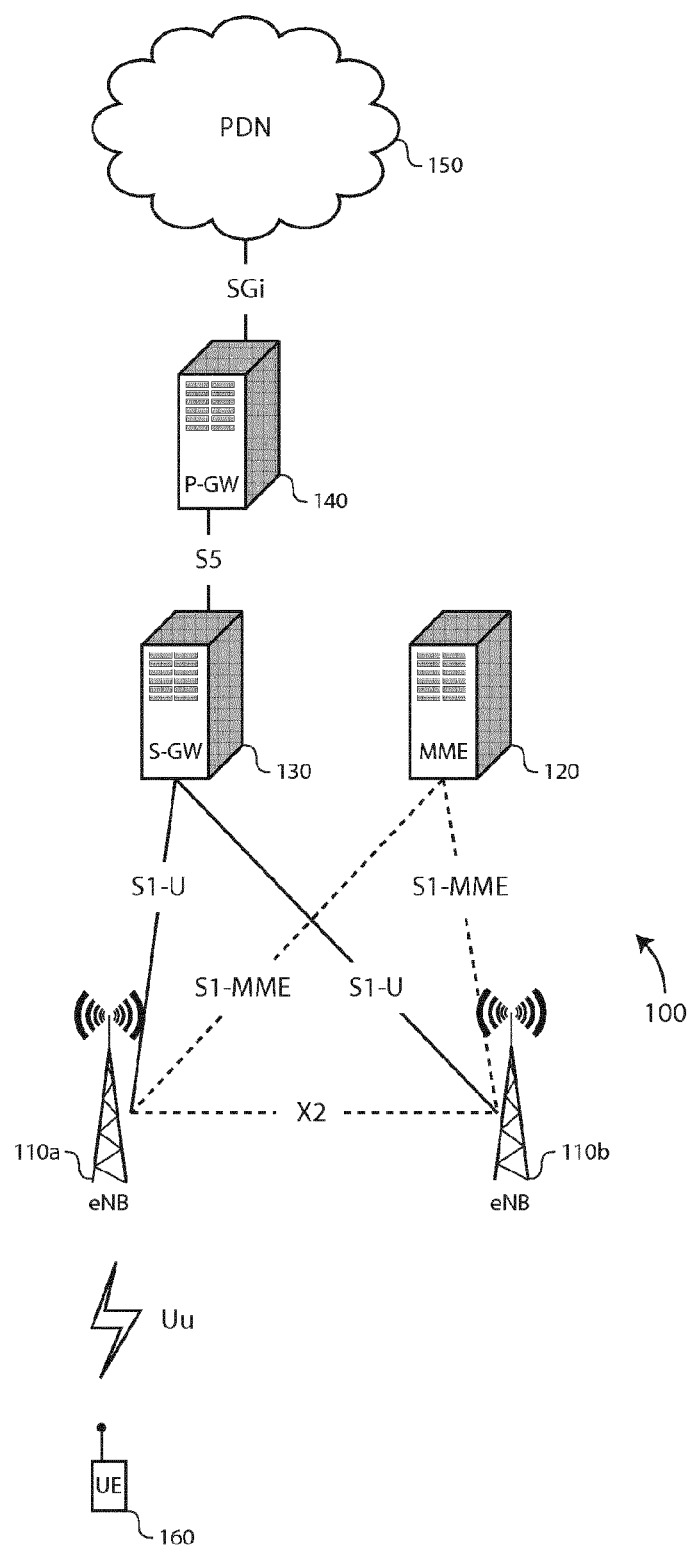
FIG. 1 represents Long Term Evolution (LTE) mobile network infrastructure.

There is seen in FIG. 1 a part 100 of LTE Radio Access Network (E-RAN) and an Evolved Packet Core (EPC) comprising the following network elements:

Evolved NodeB (eNB) 110,
a Mobility Management Entity (MME) 120,
a Serving Gateway (S-GW) 130,
a Packet Data Network (PDN) Gateway (P-GW) 140,
a PDN 150, and
a UE 160.

The eNBs 110 are coupled to the MME 120 through an S1-MME interface, and to the S-GW 130 through an S1-U interface. The S-GW 130 is further coupled to the P-GW 140 through an S5 interface. The P-GW 140 is further coupled to a PDN 150 through an SGi interface. The eNBs 120 establish neighbor relationships with neighboring eNBs through an X2 interface.

The eNBs 110 operate micro or pico cells with a small and confined coverage area, typically from a few tens meters up to a few hundreds meters. The eNBs 110 are configured to set up and operate a radio communication channel (i.e., a set of downlink and uplink traffic radio resources) with the UE 160 through a Uu radio interface.

More noticeably, the eNBs 110 host the following functions:

Radio Resource Management: Radio Bearer Control, Radio Admission Control, Connection Mobility Control, Dynamic allocation of resources to UEs in both uplink and downlink (scheduling);
Routing of user-plane data towards the S-GW;
Scheduling and transmission of paging messages from the MME;
Scheduling and transmission of broadcast information;
Measurement and measurement reporting configuration for mobility and scheduling.

The MME 120 hosts the following functions:
Non Access Stratum (NAS) signaling;
Idle mode UE reachability, including control and execution of paging retransmission;
Tracking Area (TA) list management for UE in idle and active mode;
S-GW selection;
MME selection for inter-MME handovers;
Roaming;
Authentication;
Bearer management functions including dedicated bearer establishment.

The S-GW 130 hosts the following functions:
Local Mobility Anchor point for inter-eNB handover;
E-UTRAN idle mode downlink packet buffering and initiation of network triggered service request procedure;
Lawful Interception;
Packet routing and forwarding;
Transport level packet marking in the uplink and the downlink;
downlink and uplink charging per UE, PDN, and QoS Class Identifier (QCI).

The P-GW 140 hosts the following functions:
UE IP address allocation and IP anchor point;
Per-user based packet filtering (e.g., by means of deep packet inspection);
Lawful Interception;
Downlink and uplink service level charging, gating and rate enforcement.

Figure 2:
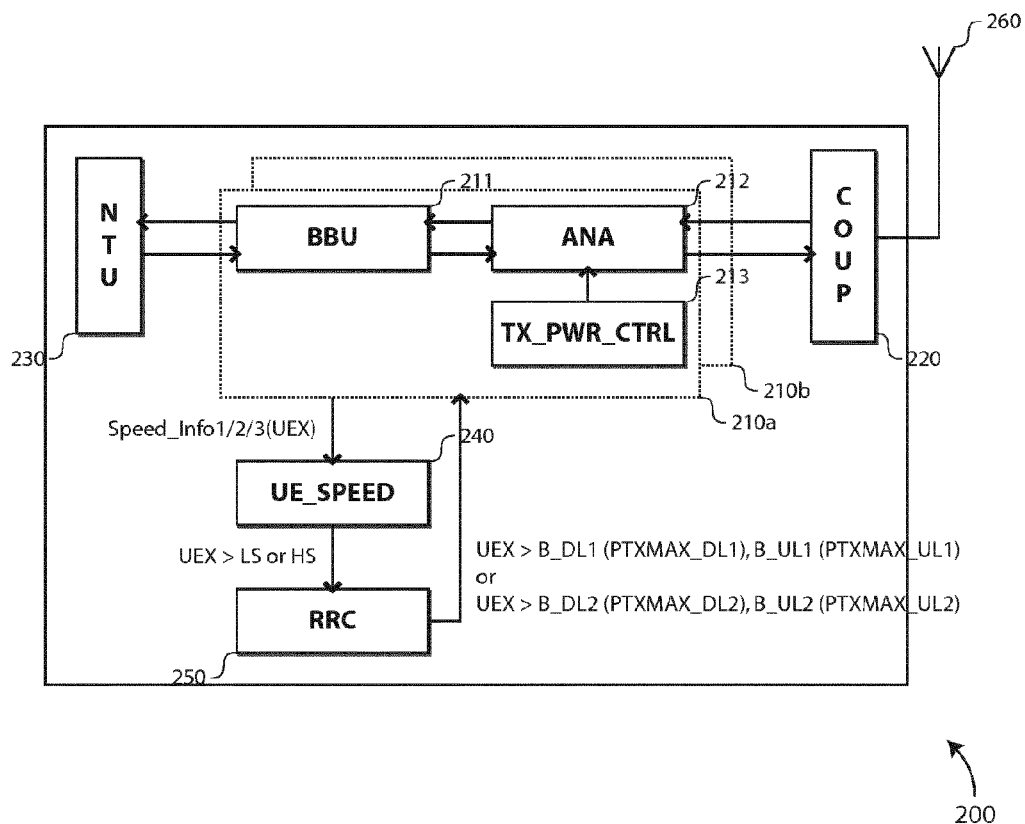
FIG. 2 represents a radio base station comprising a radio access arrangement according to the invention.

There is seen in FIG. 2 further details about an eNBs 200 comprising a radio access arrangement according to the invention.

The eNB 200 comprises the following functional blocks:
one or more transceiver 210, each one comprising a digital base-band unit 211 (or BBU), an analog band-pass unit 212 (or ANA), and a transmit power controller 213 (or TX_PWR_CTRL),
a coupling unit 220 (or COUP),
a network termination unit 230 (or NTU),
a UE speed determination unit 240 (or UE_SPEED), and
a radio resource controller 250 (or RRC).

The network termination unit 230 is bi-directionally coupled to the digital base-band unit 211, the digital base-band unit 211 is bi-directionally coupled to the analog band-pass unit 212, the analog band-pass unit 212 is bi-directionally coupled to the coupling unit 220, and the coupling unit 220 is coupled to an external or internal antenna 260. The transmit power controller 213 is coupled to the analog band-pass unit 212. The UE speed determination unit 240 and the radio resource controller 250 are coupled to the transceiver 210. The radio resource controller 250 is further coupled to the UE speed determination unit 240.

The transceiver 210 is configured to establish and operate radio communication channels with UEs under control of the radio resource controller 250. The transceiver 210 operates within downlink and uplink radio partitions B_DL and B_UL, which are split into first downlink and uplink radio partitions B_DL1 and B_UL1 for communication with low-speed users, and second disjoint downlink and uplink radio partitions B_DL2 and B_UL2 for communication with high-speed users.

The digital base-band unit 211 is for digitally processing the received and transmit data symbols. The digital base-band unit 211 implements the necessary protocol suites for issuing, terminating or relaying data and control packets towards/from the UEs 10 from/towards the MME 30 or SG 40.

The analog band-pass unit 212 is for modulating, amplifying and shaping the transmit signal that ultimately feeds the antenna, and for filtering, amplifying and demodulating the received signal from the antenna. The analog band-pass 212 unit can be merged with the digital base-band unit, or can be moved closer to the antenna in a so-called Remote Radio Head-end (RRH) configuration.

The transmit power controller 213 is for controlling the downlink and uplink transmit power respectively used by the transceiver 210 and the UE 10 during a particular communication session, such as a voice call or a data session. The transmit power controller 213 controls the current downlink and uplink transmit power level so as compensate for the respective path losses incurred by the downlink and uplink radio signals, and so as to achieve an acceptable Signal to Noise and Interference Ratio (SNIR) and thus a certain Quality of Service (QoS) while limiting interference with neighbor cells re-using the same radio resources.

The transmit power controller 213 further controls the current downlink and uplink transmit power level as being below a downlink and uplink maximum transmit power level respectively, thereby yielding a specific radio coverage reach (the higher the maximum transmit power level, the longer the radio coverage reach). First maximum transmit power levels PTXMAX_DL1 and PTXMAX_UL1 are used for radio communication within the first radio partitions B_DL1 and B_UL1 respectively, and second substantially higher maximum transmit power levels PTXMAX_DL2 and PTXMAX_UL2 are used for radio communication within the second radio partitions B_DL2 and B_UL2 respectively.

The coupling unit 220 is for passing the transmit signal from the transceiver 210 towards the antenna, and for dispatching the receive signal from the antenna towards the transceiver 210.

The network termination unit 230 is for connecting to a data communication network for further communication with the MME and the S-GW, and with further eNBs. The network termination unit 230 accommodates the appropriate Medium Access Control (MAC) and Physical transport (PHY) layers, as well as some frame dispatching logic for routing the incoming/outgoing frames towards the appropriate I/O ports.

The radio resource controller 250 is configured to assign and manage downlink and uplink radio resources used by the transceiver 210 and the respective UEs for radio communication over the air interface, that is to say a set of time and/or frequency resources assigned to the respective Radio Access Bearers (RAB) for transport of user traffic.

Radio Resource Management (RRM) is the system level control of co-channel interference and other radio transmission characteristics in mobile communication systems. RRM involves strategies and algorithms for controlling parameters such as the transmit power, the channel allocation, the handover criteria, the modulation scheme, the error coding scheme, etc. The objective is to utilize the limited radio spectrum resources and radio network infrastructures as efficiently as possible.

RRM is especially important in systems limited by co-channel interference rather than by noise, for example in networks consisting of many adjacent access points that may reuse the same channel frequencies.

The objective of RRM is therefore to maximize the system spectral efficiency while guaranteeing a certain grade of service. The latter involves covering a certain area and avoiding outage or impairments due to co-channel interference, noise, attenuation caused by long distances, fading caused by shadowing and multi-path, Doppler shift and other forms of distortion. The grade of service is also affected by blocking due to admission control, scheduling starvation or inability to guarantee the requested Quality of Service (QoS).

Dynamic RRM schemes adaptively adjust the radio network parameters to the traffic load, user positions, QoS requirements, etc. Dynamic RRM schemes are considered in the design of wireless systems, in view to minimize expensive manual cell planning and achieve tighter frequency reuse patterns, resulting in improved system spectral efficiency. Some schemes are centralized, others are distributed, either autonomous algorithms in base stations and UEs, or coordinated algorithms by exchanging information between base stations.

Examples of dynamic RRM schemes are power control algorithms, link adaptation algorithms, Dynamic Channel Allocation (DCA) or Dynamic Frequency Selection (DFS) algorithms, traffic adaptive handover, adaptive filtering (e.g., Single Antenna Interference Cancellation (SAIC)), dynamic diversity schemes (e.g., soft handover, phased array antenna with beam-forming and/or Multiple-Input Multiple-Output (MIMO) communications and/or space-time coding), admission control, dynamic bandwidth allocation using resource reservation multiple access schemes or statistical multiplexing, cognitive radio, etc.

The radio resource controller 250 is further configured to assign downlink and uplink RABS according to UE speed information supplied by the speed determination logic 240. The radio resource controller 250 assigns downlink and uplink RABS for L1 transport of user traffic within the first downlink and uplink radio partitions B_DL1 and B_UL1 respectively if the UE is characterized by the speed determination logic 240 as belonging to a low-speed category LS (see UEX>B_DL1 (PTXMAX_DL1), B_UL1 (PTXMAX_UL1) in FIG. 2), or within the second downlink and uplink radio partitions B_DL2 and B_UL2 respectively if the UE is characterized as belonging to a high-speed category HS (see UEX>B_DL2 (PTXMAX_DL2), B_UL2 (PTXMAX_UL2) in FIG. 2).

The speed determination logic 240 is configured to characterize a particular UE as belonging to the low-speed category LS or the high-speed category HS by comparing the UE speed to a reference speed threshold. The speed determination logic 240 determines the UE speed category according to first speed information Speed_Info1 supplied by the UE (e.g., as estimated from GPS positioning data), and/or according to second speed information Speed_Info2 determined by the eNB 200 (e.g., the Doppler frequency shift is indicative of the radial UE speed with respect to the eNB 200), and/or according to third speed information Speed_Info3 relayed by a neighboring source eNB during a handover procedure towards a target cell operated by the eNB 200 (e.g., as derived from the time spent in previous visited cells, or as explicitly encoded by the source eNB). The required speed precision is linked to the number of speed classes.

The result of the UE speed characterization is passed to the radio resource controller 250 for further radio resource assignment (see UEX>LS or HS in FIG. 2).

Figure 3:
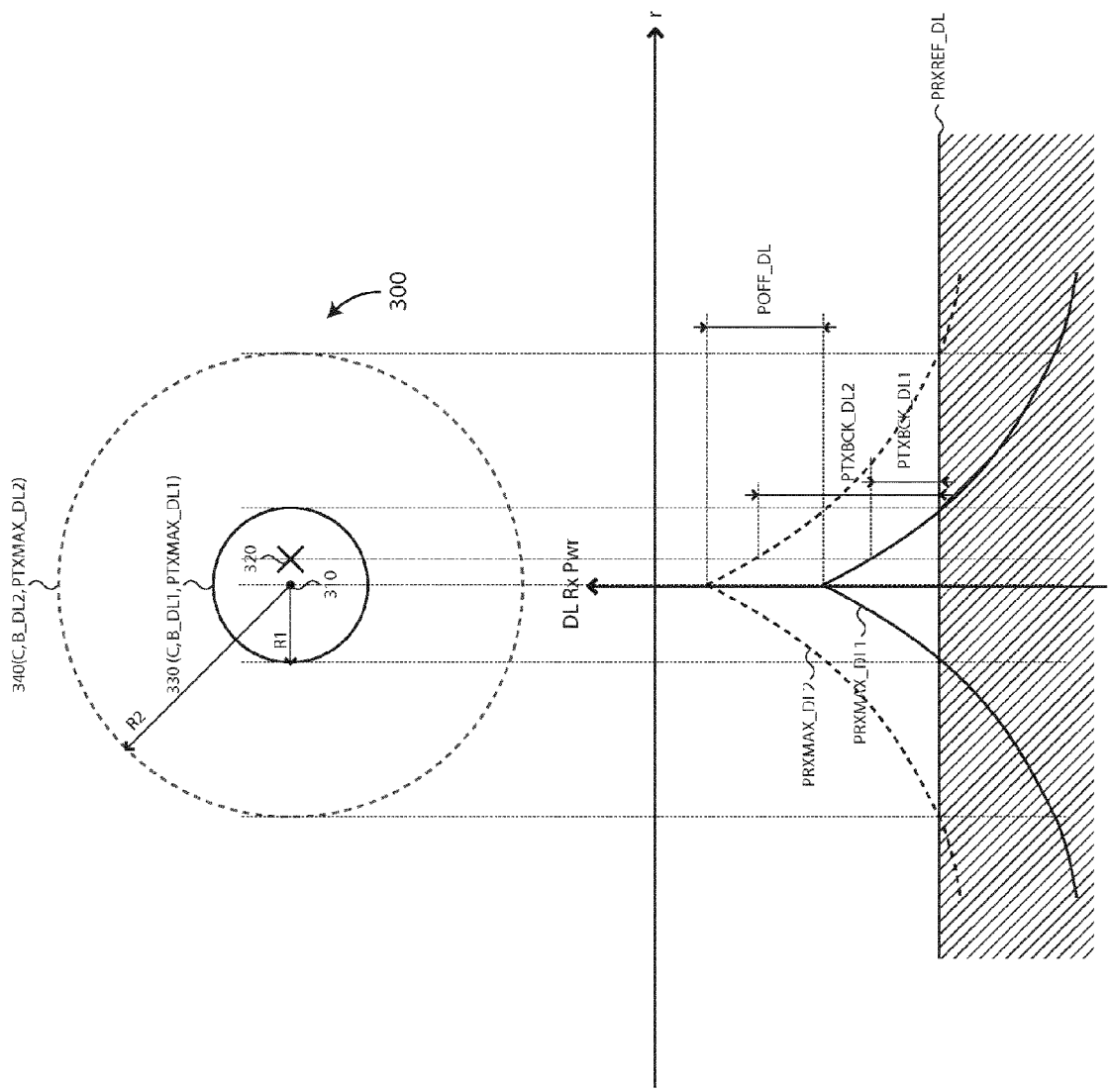
FIG. 3 represents a cell operated according to the invention.

There is seen in FIG. 3 a downlink radio coverage area 300 of a cell C operated by an eNB 310 comprising a radio access arrangement according to the invention. Although the cell C has been depicted as an omni-directional cell, the cell C can be a sectored cell as well.

The downlink radio coverage area comprises a first short-reach downlink radio coverage area 330 for communication with low-speed UEs associated with a first downlink radio partition B_DL1 and a first nominal downlink maximum transmit power level PTXMAX_DL1, and a second long-reach downlink radio coverage area 340 for communication with high-speed users associated with a second downlink radio partition B_DL2 and a second boosted downlink maximum transmit power level PTXMAX_DL2 substantially higher than PTXMAX_DL1.

The receive power, as measured by a UE 320, of a downlink signal transmitted at the first nominal maximum transmit power level PTXMAX_DL1 by the eNB 310 is plotted as a first function PRXMAX_DL1 of the distance r between the UE 320 and the eNB 310. The receive power, as measured by the UE 320, of a downlink signal transmitted at the second boosted maximum transmit power level PTXMAX_DL2 by the eNB 310 is plotted as a second function PRXMAX_DL2 of the distance r between the UE 320 and the eNB 310. The two plots PRXMAX_DL1 and PRXMAX_DL2 are separated by a downlink power offset POFF_DL, wherein PTXMAX_DL2=PTXMAX_DL1+POFF_DL (1).

The reference downlink receive power level for achieving a certain SNIR, and thus a certain QoS, is plotted as a bottom straight line PRXREF_DL. The difference between PRX- MAX_DL1 and PRXREF_DL represents the amount of downlink transmit power backoff PTXBCK_DL1 that can be applied by the eNB 310 in the first radio partition B_DL1 for limiting radio interferences while achieving an acceptable QoS. The current downlink transmit power level PTX_DL1 used by the eNB 310 for communication within the first radio partition B_DL1 can thus be written as PTX_DL1=PTXMAX_DL1−PTXBCK_DL1 (2). The difference between PRXMAX_DL2 and PRXREF_DL represents the amount of downlink transmit power backoff PTXBCK_DL2 that can be applied by the eNB 310 in the second radio partition B_DL2. The current downlink transmit power level PTX_DL2 used by the eNB 310 for communication within the second radio partition B_DL2 can thus be written as PTX_DL2=PTXMAX_DL2−PTXBCK_DL2 (3).

When a downlink communication is established between the eNB 310 and the UE 320 in the first downlink radio partition B_DL1, and the UE 320 moves away from the eNB 310, then the downlink transmit power backoff PTXBCK_DL1 becomes null at some distance R1, meaning that the configured downlink maximum transmit power level PTXMAX_DL1 is reached. From this point outwards, the receive SNIR starts degrading, and the communication session should ideally be switched towards a more suitable neighboring cell by means of a handover procedure. The distance R1 corresponds to the maximum coverage reach of the first radio coverage area 330.

The same description applies mutatis mutandis to the second radio coverage area 340, with R2 as the maximal radio coverage reach of the second radio coverage area 340.

Transmit power boost for high-speed users can equivalently be achieved by means of smart antennas and beam forming techniques so as to increase the receive power, and thus the radio coverage reach, for a particular mobile device that has been characterized as belonging to the high-speed category.

Figure 4:
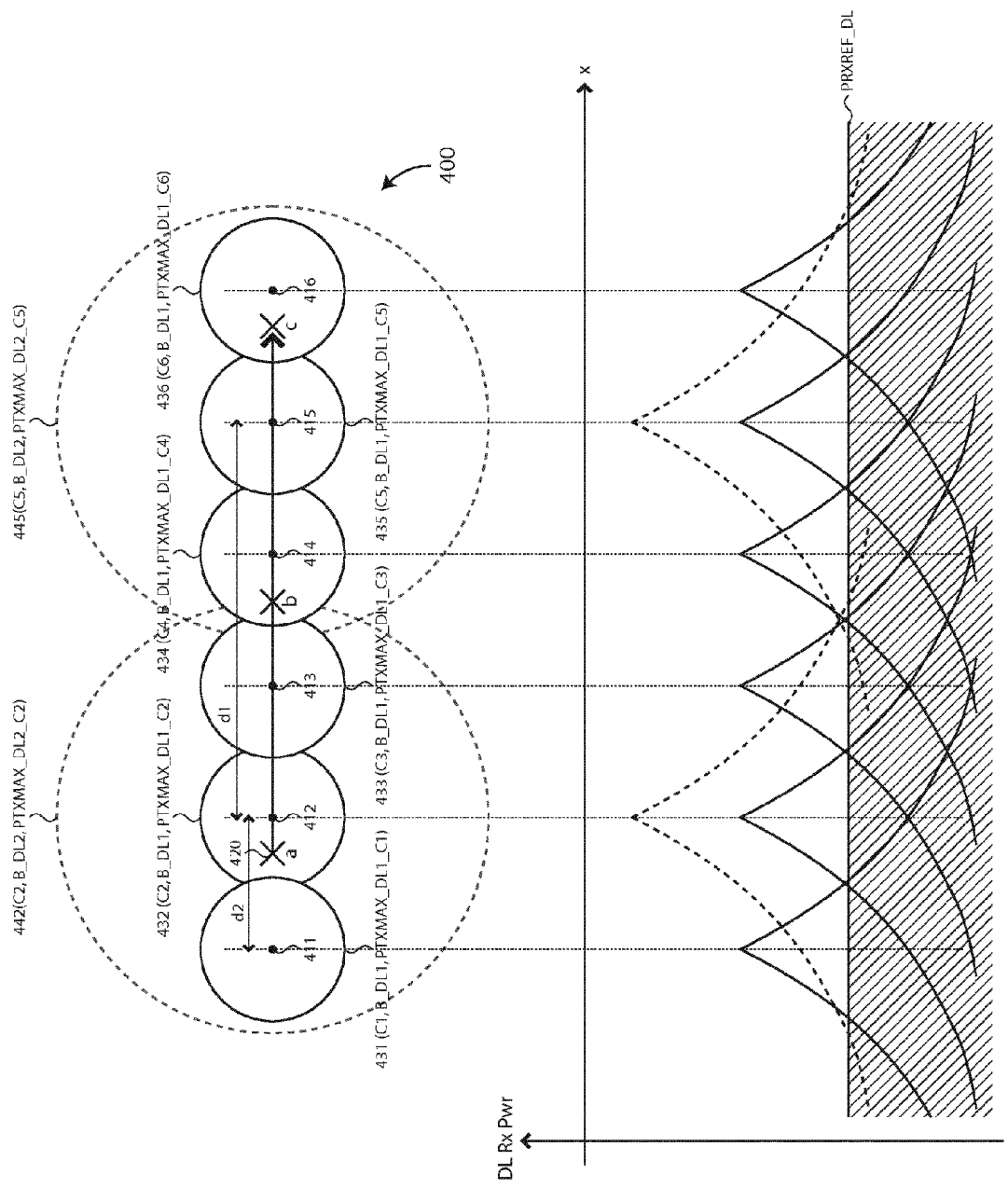
FIG. 4 represents a cluster of picocells, a few of which are operated according to the invention.

There is seen in FIG. 4 an exemplary radio coverage area 400 comprising six picocells C1 to C6 operated by respective eNBs 411 to 416.

The downlink radio resources commonly shared by the picocells C1 to C6 are split into first and second disjoint radio resource partitions B_DL1 and B_DL2, and the uplink radio resources commonly shared by the picocells C1 to C6 are split into first and second disjoint radio resource partitions B_UL1 and B_UL2.

Radio resources can be partitioned into the frequency domain and/or the time domain. For instance, downlink Physical Resource Blocks (PRB) can be assigned to either B_DL1 or B_DL2 exclusively, and uplink PRBs can be assigned to either B_UL1 or B_UL2 exclusively. The PRBs assigned to a radio resource partitions does not need to be contiguous.

The picocells C2 to C5 are configured to operate within the first downlink and uplink radio partitions B_DL1 and B_UL1 for downlink and uplink communication with low-speed users respectively, and to operate within the second downlink and uplink radio partitions B_DL2 and B_UL2 for downlink and uplink communication with high-speed users respectively.

First nominal downlink and uplink maximum transmit power levels PTXMAX_DL1_C2, PTXMAX_DL1_C5 and PTXMAX_UL1_C2, PTXMAX_UL1_C5 are configured for downlink and uplink communication within the cells C2 and C5 and within the first radio partitions B_DL1 and B_UL1 respectively, thereby yielding first short-reach radio coverage areas 432 and 435 for the picocells C2 and C5.

Second boosted downlink and uplink maximum transmit power levels PTXMAX_DL2_C2, PTXMAX_DL2_C5 and PTXMAX_UL2_C2, PTXMAX_UL2_C5 are configured for downlink and uplink communication within the cells C2 and C5 and within the second downlink and uplink radio partitions B_DL2 and B_UL2 respectively, thereby yielding second long-reach radio coverage areas 442 and 445 for the picocells C2 and C5.

The remaining 4 picocells C1, C3, C4 and C6 are configured to operate within the first downlink and uplink radio partitions B_DL1 and B_UL1 for downlink and uplink communication with UEs irrespective of their speed.

First nominal downlink and uplink maximum transmit power levels PTXMAX_DL1_C1, PTXMAX_DL1_C3, PTXMAX_DL1_C4, PTXMAX_DL1_C6 and PTXMAX_UL1_C1, PTXMAX_UL1_C3, PTXMAX_UL1_C4, PTXMAX_UL1_C6 are configured for downlink and uplink communication within the cells C1, C3, C4 and C6, thereby yielding first short-reach radio coverage areas 431, 433, 434 and 436 for the picocells C1, C3, C4 and C6 respectively.

The second boosted downlink and uplink maximum transmit power levels PTXMAX_DL2_C2, PTXMAX_DL2_C5 and PTXMAX_UL2_C2, PTXMAX_UL2_C5 are determined according to first inter-node distances d1 between the eNBs operating the cells C2 and C5 so as to minimize inter-cell interferences within the second downlink and uplink radio partitions B_DL2 and B_UL2.

The first nominal downlink and uplink maximum transmit power levels PTXMAX_DL1_C1, PTXMAX_DL1_C2, PTXMAX_DL1_C3, PTXMAX_DL1_C4, PTXMAX_DL1_C5, PTXMAX_DL1_C6 and PTXMAX_UL1_C1, PTXMAX_UL1_C2, PTXMAX_UL1_C3, PTXMAX_UL1_C4, PTXMAX_UL1_C5, PTXMAX_UL1_C6 are determined according to second inter-node distances d2 between the eNBs operating the cells C1 to C6 so as to minimize inter-cell interferences within the first downlink and uplink radio partitions B_DL1 and B_UL1.

It is to be noticed that the first uplink and/or downlink radio partitions used by the cells C1 to C6 do not necessarily coincide, e.g. on account of different eNB capacities, and/or of a higher cell re-use pattern. So do the second uplink and/or downlink radio partitions used by the cells C2 and C5. However, it is of first matter that any of the second radio partitions used by cells C2 and C5 do not overlap with any of the first radio partitions used by cells C1 to C6.

The capacities of the first and second downlink radio partitions B_DL1 and B_DL2, and of the first and second uplink radio partitions B_UL1 and B_UL2, can be adjusted in a semi-static way, depending on the proportion of users from each UE speed class. This proportion is subject to vary during daytime and according to the covered geographical area. This adjustment shall be carried out consistently throughout all the picocells C1 to C6.

The configuration of the eNBs 411 to 416 and associated cells C1 to C6, including the configuration of the radio partitions to be used by the respective cells and corresponding maximum transmit power levels, is carried out by a network manager (not shown) coupled to the eNBs 411 to 416. Yet, Self Organizing Network (SON) aims to move most of the configuration and management work into the eNBs 411 to 416 so as to reduce the Operation Expenditures (OPEX).

There is also seen in FIG. 4 a fast-moving UE 420 going from position a towards position c along a straight line. The downlink maximum receive power of the respective cell reference signals as measured by the UE 420 is plotted below as a function of the covered distance x.

The downlink cell reference signal, which is used for neighbor cell measurements, and further for cell [re-]selection and handover decision, is assumed to be transmitted at the first nominal downlink maximum transmit power level PTXMAX_DL1 that is configured for communication within the first downlink radio partition B_DL1.

At position a, the UE 420 establishes a communication session within cell C2. After random access and timing advance determination, the UE starts exchanging signaling messages with the eNB 412 for establishing downlink and uplink RABs for L1 transport of user traffic.

During this call set-up, the UE 420 sends speed information indicative of its speed to the eNB 412. The eNB 412 compares this speed with a reference threshold so as to determine whether the UE 410 is a low-speed or high-speed UE. Presently, the UE 420 is characterized as belonging to the high speed category HS.

Consequently, the eNB 412 assigns one or more downlink RAB in the downlink radio partition B_DL2, and one or more uplink RABs in the uplink radio partition B_UL2. The boosted downlink and uplink transmit power levels PTXMAX_DL2_C2 and PTXMAX_UL2_C2 that are used for communication within the cell C2 and the second downlink and uplink radio partitions B_DL2 and B_UL2 allows to serve the fast-moving UE 420 over a longer distance.

Also, the eNB 412 sends a MEASUREMENT CONTROL message to the UE 420, whereby the UE 420 is configured with an ad-hoc measurement policy. More specifically, the UE 420 is configured with a handover event A3 (neighbor cell becomes offset better than serving cell) comprising a generic offset parameter OFF for triggering the event condition A3, a hysteresis HYS for entering and leaving the event condition A3, and a TTT period during which the event condition A3 shall be fulfilled before reporting the event to the eNB 412. The UE 420, as a fast moving UE, is further configured with a positive cell specific offset OCS2 for the serving cell C2, with a positive cell specific offset OCN5 for the neighboring cell C5, and with negative cell specific offsets OCN1, OCN3 and OCN4 for further neighboring cells C1, C3 and C4 respectively. The serving cell specific offset OCS2 for cell C2 matches the difference between the boosted and nominal downlink maximum transmit power levels PTXMAX_DL2_C2−PTXMAX_DL1_C2, and the neighboring cell specific offset OCN5 for cell C5 matches the difference between the boosted and nominal downlink maximum transmit power levels PTXMAX_DL2_C5−PTXMAX_DL1_C5. The negative neighboring cell specific offsets OCN1, OCN3 and OCN4 for cells C1, C3 and C4 are adjusted so as to avoid the fast-moving UE 420 to trigger a handover event A3 towards the picocells C1, C3 and C4, which are not suitable for handling fast-moving UEs.

The UE 420 measures signal strength and/or signal quality from neighboring cells, and compares them with the respective handover thresholds.

On the way towards position b, the UE 420 enters the short-reach radio coverage area 413 of the cell C3, but does not detect any handover condition towards the cell C3 as the measured power of C3 beacon signal is correctly offset by an appropriate negative amount.

At position b, the UE 420 leaves the long-reach radio coverage area 442 of the cell C2 and the short-reach radio coverage area 443 of the cell C3, and enters the long-reach radio coverage area 445 of the cell C5 and the short-reach radio coverage area 414 of cell C4. The UE 420 does not detect any handover condition towards the cell C4 as the measured power of C4 beacon signal is correctly offset by an appropriate negative amount, but does detect the measured power of C5 beacon signal, appropriately offset by a positive amount PTXMAX_DL2_C5−PTXMAX_DL1_C5, as fulfilling the condition A3. Consequently, and provided this condition is fulfilled during TTT seconds, the UE 420 sends a MEASUREMENT REPORT message to the source eNB 412 for notifying a handover event A3 towards the target cell C5.

Thereupon, the source eNB 412 decides to perform a handover for the UE 420 from the source cell C2 towards the target cell C5. The source eNB 412 sends a HANDOVER REQUEST message to the target eNB 415 via the X2 interface (in case of intra-MME handover), or a HANDOVER REQUIRED message to the MME via the S1-MME interface to be relayed as a HANDOVER REQUEST message towards the target eNB 415 (in case of inter-MME handover). The HANDOVER REQUEST/REQUIRED message includes the time the UE 420 spent in each previously-visited cell, such as the cell C2, in the UE History Information Element (IE). The target eNB 415 may characterize the UE 420 as a fast-moving UE from the UE History IE. Alternatively, the source eNB 412 may explicitly encode, into the HANDOVER REQUEST/REQUIRED message, the UE speed category to which the UE 420 belongs.

After resource admission control, the target eNB 415 reserves the necessary downlink and uplink RAB5 within the second radio partition B_DL2 and B_UL2, and sends a HANDOVER REQUEST ACK message back to the source eNB 412, which message including a RRC CONNECTION RECONFIGURATION container to be passed transparently by the source eNB 412 to the UE 420 as an RRC message.

The UE 420 receives the RRC CONNECTION RECONFIGURATION message with necessary parameters, and is commanded by the source eNB 412 to perform the handover. When the UE 420 has successfully accessed the target cell C5, the UE 420 sends the RRC CONNECTION RECONFIGURATION COMPLETE message to the target eNB 415. The target eNB 415 can now begin sending data to the UE 420, and the source eNB 412 can definitively release the radio resources previously allocated to the UE 420.

Thus, the fast-moving UE 420 is directly moved from the second radio partition 442 of the cell C2 to the second radio partition 445 of the cell C5 without being captured by the single-partition cells C3 and C4. As one can see, the number of handovers has been considerably reduced as the UE 420 only performed one handover while crossing the picocells C2, C3, C4, C5 and C6, thereby yielding a substantial reduction in terms of handover signaling load and handover failures.

In an alternative embodiment of the present invention, the downlink cell reference signal is transmitted at the second boosted downlink maximum transmit power level PTXMAX_DL2 that is configured for communication within the second downlink radio partition B_DL2.

If so, slow-moving UEs are configured with no offset for single-partition cells C1, C3, C4 and C6, and negative offsets for double-partition cells C2 and C5, and fast-moving UEs are configured with no offset for double-partition cells C2 and C5, and with negative offsets for single-partition cells C1, C3, C4 and C6.

Although the above description has made exhaustive references to LTE technology and terminology, the Radio Access Network (RAN) may operate in accordance with other mobile or wireless communication technologies such as Global System Mobile (GSM), or Code Division Multiple Access (CDMA), or Universal Mobile Terrestrial system (UMTS), etc. For instance, the described radio access arrangement would form part of a Base Station Controller (BSC) or Radio Network Controller (RNC) for radio resource control, and of a Base Transceiver Station (BTS) or NodeB for transmit power control. UE speed characterization can be indistinctly performed by the BSC or RNC, or by the BTS or NodeB.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A radio access arrangement for operating a radio cell (C), and comprising one or more processors configured to:
   set up and operate radio communication channels with mobile devices,
   characterize a particular mobile device as belonging to a high-speed category (HS) or a lower-speed category (LS) according to speed information indicative of a speed of the particular mobile device,
   assign a particular radio communication channel, for communication with the particular mobile device, within a first radio resource partition of the radio cell if the particular mobile device is characterized as belonging to the lower-speed category, or within a second disjoint radio resource partition of the radio cell if the particular mobile device is characterized as belonging to the high-speed category, and
   if when the particular radio communication channel is assigned within the first radio resource partition, set a transmit power used for communication over the particular radio communication channel as being lower than a first maximum transmit power level; and
   if when the particular radio communication channel is assigned within the second radio resource partition, set the transmit power used for communication over the particular radio communication channel as being lower than a second maximum transmit power level substantially higher than the first maximum transmit power level;
   wherein the first radio resource partition and the second radio resource partition are both of the radio cell.

2. A radio access arrangement according to claim 1, wherein the first and second radio resource partitions are first and second disjoint frequency partitions respectively.

3. A radio access arrangement according to claim 1, wherein the first and second radio resource partitions are first and second disjoint time partitions respectively.

4. A radio access arrangement according to claim 1, wherein the first and second radio resource partitions are first and second disjoint code partitions respectively.

5. A radio access arrangement according to claim 1, wherein the speed information is obtained from a source radio access arrangement operating a source radio cell during a handover of the particular mobile device from the source radio cell towards the radio cell.

6. A radio access arrangement according to claim 1, wherein the one or more processors are further configured to configure a particular measurement policy for the particular mobile device and for a particular neighbor cell in dependence of whether the particular mobile device is characterized as belonging to the high-speed or lower-speed category, and in dependence of whether the particular neighbor cell supports radio resource partitioning for high-speed and lower-speed mobile devices.

7. A method for operating a radio cell (C), and further for setting up and operating radio communication channels with mobile devices,
wherein the method comprises:
   characterizing a particular mobile device as belonging to a high-speed category (HS) or a lower-speed category (LS) according to speed information indicative of a speed of the particular mobile device,
   assigning a particular radio communication channel for communication with the particular mobile device within a first radio resource partition of the radio cell if the particular mobile device is characterized as belonging to the lower-speed category, or within a second disjoint radio resource partition of the radio cell if the particular mobile device is characterized as belonging to the high-speed category,
   if when the particular radio communication channel is assigned within the first radio resource partition, setting a transmit power used for communication over the particular radio communication channel as being lower than a first maximum transmit power level, and
   if when the particular radio communication channel is assigned within the second radio resource partition, setting the transmit power used for communication over the particular radio communication channel as being lower than a second maximum transmit power level substantially higher than the first maximum transmit power level;

wherein the first radio resource partition and the second radio resource partition are both of the radio cell.

8. A method according to claim 7, wherein the first and second radio resource partitions are first and second disjoint frequency partitions respectively.

9. A method according to claim 7, wherein the first and second radio resource partitions are first and second disjoint time partitions respectively.

10. A method according to claim 7, wherein the first and second radio resource partitions are first and second disjoint code partitions respectively.

11. A method according to claim 7, wherein the speed information is obtained from a source radio base station operating a source radio cell during a handover of the particular mobile device from the source radio cell towards the radio cell.

12. A method according to claim 7, wherein the method further comprises:

configuring a particular measurement policy for the particular mobile device and for a particular neighbor cell in dependence of whether the particular mobile device is characterized as belonging to the high-speed or lower-speed category, and in dependence of whether the particular neighbor cell supports radio resource partitioning for high-speed and lower-speed mobile devices.

13. A method according to claim 7, wherein the speed information indicative of a speed of the particular mobile device comprises information estimated from global positioning system data.

14. A method according to claim 7, wherein the speed information indicative of a speed of the particular mobile device comprises information determined from a Doppler frequency shift.

15. A method according to claim 7, wherein the speed information indicative of a speed of the particular mobile device comprises information derived from a time the particular mobile device spent in a previous cell.

* * * * *